United States Patent [19]

Tabor

[11] 3,904,693

[45] Sept. 9, 1975

[54] DIMEDONE DERIVATIVES OF DIALDEHYDES

[76] Inventor: Robert G. Tabor, 1407 W. Tucker Blvd., Arlington, Tex. 76013

[22] Filed: Nov. 8, 1973

[21] Appl. No.: 413,771

[52] U.S. Cl............ 260/586 R; 71/123; 260/586 C; 424/331
[51] Int. Cl.$^2$......................................... C07C 49/36
[58] Field of Search ............................... 260/586 R

[56] References Cited
OTHER PUBLICATIONS

Kwan et al., "Chem. Abstracts," Vol. 61, p. 7597g (1964).

Fleury et al., "Chem. Abstracts" Vol. 50, p. 5466d, (1956).

Fielbuedes et al., "Chem. Abstracts," Vol. 64, p. 17385g (1966).

*Primary Examiner*—Bernard Helfin
*Assistant Examiner*—Norman Morgenstern
*Attorney, Agent, or Firm*—Amster & Rothstein

[57] ABSTRACT

A novel class of dimedone derivatives of dialdehydes are useful as antimicrobial agents and fungicides. Their high activity and low toxicity make them candidates for replacements for hexachlorophene.

4 Claims, No Drawings

DIMEDONE DERIVATIVES OF DIALDEHYDES

This invention relates to a novel class of dimedone derivatives. More particularly, this invention is concerned with the dimedone derivatives of dialdehydes which are found to possess antimicrobial and fungicidal activity.

The compounds of this invention exhibit strong antimicrobial activity and negligible toxicity. They are, therefore, potential replacements for hexachlorophene. They are water insoluble; thus, as does hexachlorophene, they leave an antimicrobial residue on the skin. However, unlike hexachlorophene they are not very lipid soluble; thus, they are not readily absorbed through the skin. In addition, the compounds have some fungicidal activity.

The novel compounds of this invention have the following general formula:

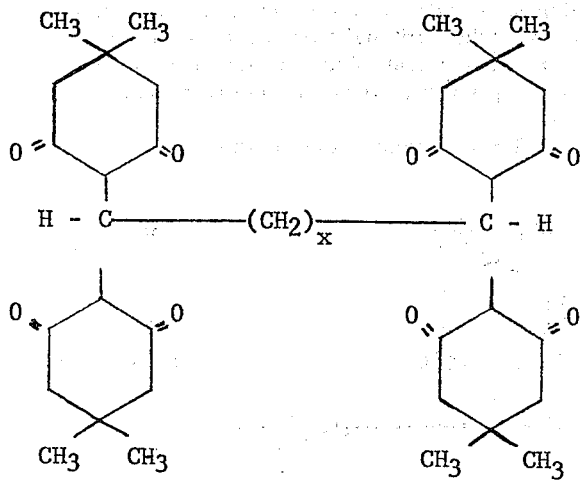

where $x$ is an integer of from 1 to 6 and is preferably 2 to 4, most preferably 3.

The compounds can be prepared by reacting a dialdehyde such as glutaraldehyde, succinaldehyde, adipaldehyde, malonaldehyde, or pimelaldehyde with 5,5-dimethyl-1,3-cyclohexanedione (dimedone). The reactants are heated at reflux for about 15 minutes in 50 percent aqueous methanol. The product can be formed without the need of a catalyst; a basic catalyst may even be harmful. The reaction requires four (4) moles of dimedone per mole of the dialdehyde. A slight excess of the dimedone is desirable.

It is preferred that the dialdehydes be unsubstituted. However, certain substituents may be added without diminishing the effectiveness of the derivatives. It is also preferred that the 5,5-dimethyl-1,3-cyclohexanedione not contain any other substituents. However, certain substituents may be added without diminishing the effectiveness of the compounds of this invention.

An illustrative reaction for preparing the derivatives of this invention is shown by the following equation:

The dimedone derivative of this invention may be applied as a solid, e.g., in an aerosol spray, or suitable diluent, such as water or an isotonic salt solution. The diluted compositions should comprise a diluent containing from 0.1 to 10 wt. percent of an emulsifier and from 0.1 to 5 wt. percent of the dimedone derivative. The preferred emulsifier is a mixture of polyoxyethylene ethers of mixed partial oleic esters of sorbitol anhydrides available from Sigma Chemical Co. under the trade name "Tween 80" and otherwise known as "Polysorbate 80." This material is commonly used as an emulsifying agent in the preparation of pharmaceuticals. The use in pharmaceutical formulations is discussed in Jowdy, Carolina J. Pharm., 33, 465, 467 (1952). Other suitable emulsifiers include: sodium lauryl sulfate and carboxymethylcellulose.

The compounds of this invention have general antimicrobial activity. They are effective against staphylococcus aureus, pseudomonas aeruginosa, streptococcus faecalis, escherichia coli, etc. The compounds also have fungicidal activity. They are, for example, somewhat effective against Mucor Genevensis, Rhizopus Stolonifer, Saccharomyces Cerevisiae, and Candida Albicans.

The invention will be more fully understood by reference to the following examples which are set forth herein solely for the purpose of illustration.

EXAMPLE I 5.6 grams (0.04 moles) of dimedone (5,5-dimethyl-1,3-cyclohexanedione) and 30 milliliters of 50 percent methanol-water are placed into a 50 milliliter flask fitted with a heater and reflux condenser. Mild heat is applied to dissolve and then 0.01 moles of glutaraldehyde are added. The mixture is heated at reflux for 15 minutes, during which time the reaction product forms and partially precipitataes due to its insoluble nature. The reaction mixture is cooled in ice for approximately 20 minutes and subjected to a suction filter with a Buchner funnel to obtain the product. Yields are quite high because of the insolubility of the product in the reaction solvent. The product is washed in a filter several times with warm 50 percent methanol water and air-dried or dried in a vacuum desiccator. The product has a melting point within the range of 222° to 224°C.

EXAMPLE II 5.6 grams (0.04 moles) of dimedone and 30 milliliters of 50% methanol-water are placed in a 50 milliliter flask fitted with a heater and reflux condenser. 0.01 moles of succinaldehyde are added. The mixture is heated at reflux for 15 minutes. The dimedone derivative of succinaldehyde is insoluble in the solvent and thus partially precipitates from solution even at the reflux temperatures. The reaction mixture is then cooled in ice for approximately 20 minutes and suction filter

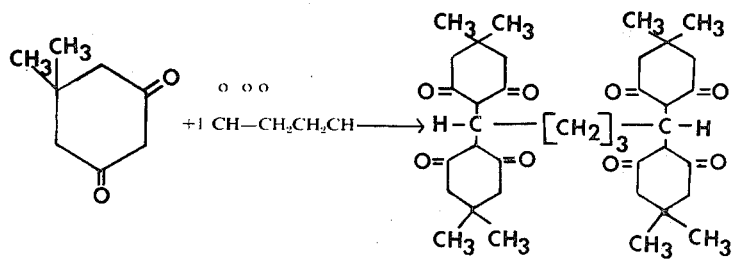

is applied with a Buchner funnel to obtain the product. Yields are high because of the insolubility of the product in the reaction solvent. The product is then washed in a filter several times with warm 50 percent methanol-water and air-dried or dried in a vacuum desiccator.

EXAMPLE III 5.6 grams (0.04 moles) of dimedone and 30 milliliters of 50 percent methanol-water are placed in a 50 milliliter flask fitted with a heater and reflux condenser. 0.01 moles of malonaldehyde are added to the solution. The mixture is heated at reflux for approximately 15 minutes, during which time the derivative is formed. The derivative is insoluble in the solvent and thus partially precipitates even at reflux temperatures. The reaction mixture is cooled in ice for 20 minutes and suction filtration is performed with a Buchner funnel to obtain the product. As with the glutaraldehyde and succinaldehyde derivatives, yields are quite high because of the insolubility of the product in a reaction solvent. The product is washed in the filter several times with 50 percent methanol-water and air-dried or dried in a vacuum desiccator.

EXAMPLE IV

The dimedone derivative of glutaraldehyde prepared in accordance with Example I is compared with phenol and hexachlorophene with respect to antimicrobial activity by the phenol coefficient test. The phenol coefficient test comprises determining the dilution factor of an aqueous phenol solution that is sufficient to kill the microbe within ten minutes but not sufficient to kill it within five minutes contact time. The same dilution factor is determined with respect to hexachlorophene and the dimedone derivative. The dilution factor of the dimedone or hexachlorophene is then divided by the dilution factor of the phenol to give the phenol coefficient. The results of the test are shown as follows in Table 1.

Table 1

| Organism | Phenol Coefficients Dimedone Derivative | Hexachlorophene |
|---|---|---|
| Staphylococcus Aureus | 16.6 | 13.9 |
| Streptococcus Faecalis | 20.8 | 20.8 |
| Pseudomonas Aeruginosa | <0.66 | 2.0 |
| Escherichia Coli | <0.66 | 2.0 |

EXAMPLE V

The compound prepared as described in Example I is tested as a fungicide using the phenol test. The results are shown in Table 2.

Table 2

| Organism | Fungicidal Activity Class | Phenol Coefficient |
|---|---|---|
| Mucor Genevensis | Bread Mould | <0.13 |
| Rhizopus Stolonifer | Fungus | <0.13 |
| Saccharomyces Cerevisiae | Yeast | <0.08 |
| Candida Albicans | Yeast Pathogen | <0.10 |

While the invention has been described by means of several specific examples, it is to be understood that modifications and variations of the invention, obvious to those skilled in the art, may be made without departing from the spirit and scope of the invention.

The embodiments of the invention in which an exclusive property or privilege is claimed are defined as follows:

1. The compound of the formula:

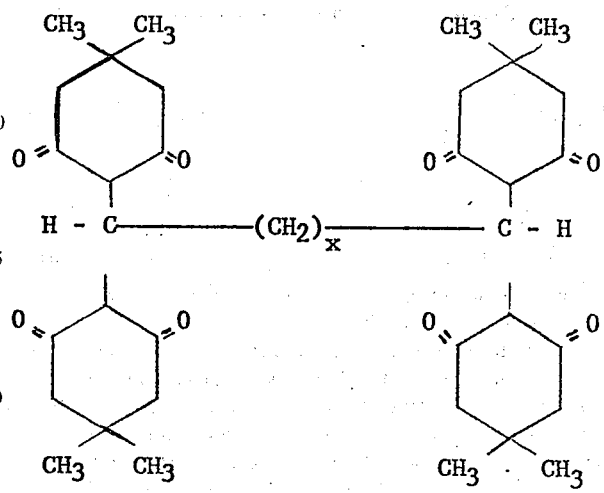

where $x$ is an integer from 2 to 4.
2. A compound defined in claim 1 wherein $x$ is 2.
3. A compound defined in claim 1 wherein $x$ is 3.
4. A compound defined in claim 1 wherein $x$ is 4.

* * * * *